(12) United States Patent
Deng et al.

(10) Patent No.: US 12,476,007 B2
(45) Date of Patent: Nov. 18, 2025

(54) TELE-HEALTH SYSTEM OF REHABILITATION TRAINING GUIDANCE FOR PATIENTS WITH CHRONIC RESPIRATORY FAILURE

(71) Applicant: ZHEJIANG UNIVERSITY, Hangzhou (CN)

(72) Inventors: Ning Deng, Hangzhou (CN); Wangshu Jiang, Hangzhou (CN); Jingyi Feng, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/039,950

(22) PCT Filed: Nov. 4, 2022

(86) PCT No.: PCT/CN2022/129836
§ 371 (c)(1),
(2) Date: Jun. 1, 2023

(87) PCT Pub. No.: WO2023/109352
PCT Pub. Date: Jun. 22, 2023

(65) Prior Publication Data
US 2024/0379224 A1      Nov. 14, 2024

(30) Foreign Application Priority Data

Dec. 14, 2021   (CN) ..................... 202111530719.2

(51) Int. Cl.
*G16H 50/20*      (2018.01)
*A61B 5/22*       (2006.01)
(Continued)

(52) U.S. Cl.
CPC ............. *G16H 50/20* (2018.01); *A61B 5/224* (2013.01); *G16H 20/30* (2018.01); *G16H 40/67* (2018.01)

(58) Field of Classification Search
CPC ........ G16H 50/20; G16H 20/30; G16H 40/67; A61B 5/224; A61B 5/08
(Continued)

(56) References Cited

U.S. PATENT DOCUMENTS 8,118,713 B2 *  2/2012  Foley ............... A63B 21/00069
                                                      482/13
9,830,832 B2 * 11/2017  Warren ................ G09B 19/003
(Continued)

FOREIGN PATENT DOCUMENTS

CN       109308940      2/2019
CN       110808092      2/2020
(Continued)

*Primary Examiner* — Joy Chng
(74) *Attorney, Agent, or Firm* — Jiwen Chen; Joywin IP Law PLLC

(57) ABSTRACT

The present invention discloses a tele-health system of rehabilitation training guidance for patients with chronic respiratory failure, comprising a functional assessment and rehabilitation training equipment group, a patient mobile terminal, a cloud server, and a doctor mobile terminal; the functional assessment and rehabilitation training equipment group interacts with the patient mobile terminal, and the patient mobile terminal and the doctor mobile terminal communicate with the cloud server, respectively. The system of the present invention can grade the acquired respiratory muscle test evaluation results, limb muscle strength test evaluation results and sputum excretion ability test evaluation results, generate the recommended rehabilitation prescription corresponding to the grade, and numerically describe the exercise intensity; the system can achieve individualized customization of the recommended rehabili- (Continued)

tation prescription, and achieve precise control of volume of exercise and place the patient in a beneficial range of volume of exercise.

10 Claims, 2 Drawing Sheets

(51) Int. Cl.
*G16H 20/30* (2018.01)
*G16H 40/67* (2018.01)

(58) Field of Classification Search
USPC .......................................................... 705/2–3
See application file for complete search history.

(56) References Cited

U.S. PATENT DOCUMENTS

| | | | | |
|---|---|---|---|---|
| 11,198,037 | B2* | 12/2021 | Volterrani | A63B 22/02 |
| 2018/0256114 | A1* | 9/2018 | Hattori | G16H 50/30 |
| 2019/0299055 | A1* | 10/2019 | Poulsen | A63B 23/18 |
| 2023/0317236 | A1* | 10/2023 | Ohno | G06T 11/00 |
| | | | | 382/128 |

FOREIGN PATENT DOCUMENTS

| | | | | |
|---|---|---|---|---|
| CN | 111111109 | | 5/2020 | |
| CN | 111632351 | | 9/2020 | |
| EP | 3236847 | B1 * | 9/2021 | ........... A61B 5/0816 |
| WO | WO2017166074 | | 5/2017 | |

* cited by examiner

TELE-HEALTH SYSTEM OF REHABILITATION TRAINING GUIDANCE FOR PATIENTS WITH CHRONIC RESPIRATORY FAILURE

This is a U.S. national stage application of PCT Application No. PCT/CN2022/129836 under 35 U.S.C. 371, filed Nov. 4, 20222 in Chinese, claiming priority of Chinese Application No. 202111530719.2, filed Dec. 14, 2021, all of which are hereby incorporated by reference.

FIELD OF TECHNOLOGY

The present invention belongs to the field of rehabilitation equipment technology, and specifically relates to a tele-health system of rehabilitation training guidance for patients with chronic respiratory failure.

BACKGROUND TECHNOLOGY

Due to limitations in respiratory function, patients with chronic respiratory failure generally experience physical inactivity volume, leading to a decreased exercise capacity and quality of life. Exercise therapy, as the core of lung rehabilitation treatment, is of great significance for the treatment and rehabilitation of patients with chronic respiratory failure. It can play an important role in enhancing exercise capacity, relieving dyspnea, reducing acute exacerbation, improving quality of life, and extending survival time.

The clinical manifestations of patients with chronic respiratory failure have strong heterogeneity, and exercise prescriptions should be customized according to the special and unique needs of individual patients. Ideally, professional physiatrist would propose various difficult training methods for all body parts (legs, arms, trunk, etc.). Home rehabilitation often lacks direct guidance from rehabilitation physicians, making it difficult for patients to obtain the most suitable training plan for their current disease status. However, the current classification methods for training methods used in tele-health systems of rehabilitation are not sufficient to describe the differences between different training plans, and it is difficult to reflect the differentiation of training plans adopted between different patients or between different periods of the same patient. Additionally, based on the current classification methods for training methods, it is difficult to establish a direct correlation between training methods and patient evaluation results.

One of the biggest challenges is to train patients at the correct intensity for exercise prescriptions, that is, within their beneficial heart rate area, which is the key to effectiveness. Home rehabilitation usually lacks direct guidance from physiatrist, making it difficult for patients to reasonably control the volume of exercise. Insufficient volume of exercise can lead to failure to achieve training effect and affect the rehabilitation process. Excessive volume of exercise may lead to fatigue, heavy limb load, and even secondary injuries.

The exercise intensity in current exercise prescriptions is usually measured using target heart rate (HR), maximum oxygen uptake (VO2max), and subjective fatigue sensation. The target heart rate (HR) depends on precision instruments and equipment used to measure heart rate during exercise, while the maximum oxygen uptake (VO2max) parameter depends on large instruments and equipment. Patients lack such instruments and equipment in their home environment. Subjective fatigue sensation relies on the patient's own perception, and patients often find it difficult to make accurate judgments about their own state during exercise. In current research, the intensity measurement method for exercise prescriptions is not suitable for home environments that lack precision, large-scale instruments and equipment, and guidance from professional rehabilitation personnel.

The Chinese patent document with publication number CN106984008A discloses a muscle training and evaluation system; the system comprises a patient information management unit, a data collection unit, a data processing unit, and a message output unit; among them, the data processing unit is used to select training sites, training actions, and prescription information based on patient information, process the received training data, and upload the processed results to the message output unit; the prescription information includes weight, treatment time, pause/rest time, single/dual rope, target value, and single/dual device training mode. The system generates recommended prescriptions based on patient evaluation data, but the relationship between the evaluation data and the recommended prescriptions is not clearly defined.

SUMMARY OF THE INVENTION

The present invention provides a tele-health system of rehabilitation training guidance for patients with chronic respiratory failure, which has low equipment requirements and can achieve individualized customization of exercise training tasks in a certain extent.

The specific technical solutions adopted are as follows:

A tele-health system of rehabilitation training guidance for patients with chronic respiratory failure, comprising a functional assessment and rehabilitation training equipment group, a patient mobile terminal, a cloud server, and a doctor mobile terminal; the functional assessment and rehabilitation training equipment group interacts with the patient mobile terminal, and the patient mobile terminal and the doctor mobile terminal communicate with the cloud server, respectively.

The functional assessment and rehabilitation training equipment group comprises a functional assessment equipment group and a rehabilitation training equipment group; the patient mobile terminal comprises a functional assessment module and a rehabilitation training module; the cloud server comprises an evaluation task management unit, a prescription recommendation service unit, a training task management unit, and a rehabilitation training supervision unit; the doctor mobile terminal comprises a prescription configuration module and a rehabilitation supervision module.

In the functional assessment and rehabilitation training equipment group, the functional assessment equipment group is used to detect the function status of patients, and the rehabilitation training equipment group is used for patients to perform home rehabilitation exercise.

In the patient mobile terminal, the functional assessment module is used to collect functional status detection data of patients and send them to the prescription recommendation service unit in the cloud server, while the rehabilitation training module is used to push rehabilitation prescriptions and collect home rehabilitation training data; the functional status detection data comprise maximal inspiratory pressure (MIP), maximal expiratory pressure (MEP), limb muscle strength grade, and peak expiratory flow (PEF).

In the cloud server described:
The evaluation task management unit is used to generate evaluation tasks and push them to the functional assessment module in the patient mobile terminal, reminding patients to conduct functional assessment.

The prescription recommendation service unit grades the acquired respiratory muscle test evaluation results, limb muscle strength test evaluation results and sputum excretion ability test evaluation results, generate the recommended rehabilitation prescription corresponding to the grade, and send the recommended rehabilitation prescription to the prescription configuration module in the doctor mobile terminal for modification and confirmation by the doctor; the recommended rehabilitation prescription comprises respiratory muscle training, limb muscle strength training, and sputum excretion ability training.

The training task management unit generates the rehabilitation prescription modified and confirmed from the doctor into exercise training tasks, and pushes the exercise training tasks to patients through the rehabilitation training module in the patient mobile terminal, and guides patients to undergo rehabilitation training, the patient's home rehabilitation training data are collected and transmitted to the rehabilitation training supervision unit in the cloud server by the rehabilitation training module in the patient mobile terminal.

The rehabilitation training supervision unit evaluates the home rehabilitation training situation of patients and generates rehabilitation training reports and prescription adjustment reminders. The rehabilitation training reports and prescription adjustment reminders are sent to the rehabilitation supervision module in the doctor mobile terminal.

Preferably, in the functional assessment and rehabilitation training equipment group, the functional assessment equipment group comprises a respiratory pressure meter, a peak flow meter, and a portable muscle tester; the rehabilitation training equipment group comprises a respiratory exerciser, load bearing sandbags, and steps.

Preferably, in the patient mobile terminal, the functional assessment module comprises a respiratory muscle function assessment unit, a sputum excretion ability evaluation unit, and a limb muscle strength evaluation unit; the rehabilitation training module comprises a rehabilitation prescription display unit and a training data recording unit.

Preferably, in the doctor mobile terminal, the prescription configuration module comprises a respiratory muscle training configuration unit, a sputum excretion ability training configuration unit, and a limb muscle strength training configuration unit; the rehabilitation supervision module comprises a functional assessment report unit and a rehabilitation training report unit.

Preferably, the evaluation task management unit in the cloud server regularly generates evaluation tasks, with a time interval of preferably once every two weeks.

Preferably, the prescription recommendation service unit in the cloud server divides the obtained respiratory muscle test evaluation results of the patient into two grades: strong and weak, and generates recommended rehabilitation prescriptions corresponding to the grades.

In the recommended rehabilitation prescription corresponding to the weak grade, the respiratory muscle training methods is suggestion suggestive breathing technique and diaphragmatic breathing.

In the recommended rehabilitation prescription corresponding to the strong grade, the respiratory muscle training methods comprises threshold inspiratory muscle training and manual resistance breathing training.

The classification method for the weak grade and strong grade is to calculate the patient's MIPpre and MEPpre, comparing with MIPmea and MEPmea, MIPpre is the predicted maximal inspiratory pressure, MEPpre is the predicted maximal expiratory pressure, MIPmea is the measured maximal inspiratory pressure, and MEPmea is the measured maximal expiratory pressure.

The calculation method for MIPpre is:

$$\text{Male: } MIPpre = 143 - 0.55 * Age$$

$$\text{Female: } MIPpre = 104 - 0.51 * Age$$

The calculation method for MEPpre is:

$$\text{Male: } MEPpre = 268 - 1.03 * Age$$

$$\text{Female: } MEPpre = 170 - 0.53 * Age$$

(1) when MIPmea<0.3*MIPpre, generating the recommended rehabilitation prescription corresponding to the weak grade;
(2) when MIPmea>0.3*MIPpre and MEPmea>0.3*MEPpre, generating the recommended rehabilitation prescription corresponding to the strong grade;
(3) when MIPmea>0.3*MIPpre and MEPmea<0.3*MEPpre, judging that the measurement value is incorrect, and the generated recommended rehabilitation prescription is empty.

Preferably, the prescription recommendation service unit in the cloud server divides the obtained patient limb muscle strength test evaluation results into three grades: A, B and C, and generates recommended rehabilitation prescriptions corresponding to the grades.

In the recommended rehabilitation prescription corresponding to the grade A, the limb muscle strength training methods comprises neuromuscular electrical stimulation and assisted training.

In the recommended rehabilitation prescription corresponding to the grade B, the limb muscle strength training methods is active anti-gravity training, which comprises heel raise, wall squat, sit to stand, wall push-ups, seated rowing, and hamstring stretch.

In the recommended rehabilitation prescription corresponding to the grade C, the limb muscle strength training methods is resistance training, which comprises shoulder press, side lateral raise, step ups, weighted shoulder press, and stretch elastic band.

The classification method for grade A, grade B, and grade C is as follows:
(1) when the evaluation result of the Medical Research Council is grade 0-1, generating a recommended rehabilitation prescription corresponding to the grade A;
(2) when the evaluation result of the Medical Research Council is grade 2-3, generating a recommended rehabilitation prescription corresponding to the grade B;
(3) when the evaluation result of the Medical Research Council is grade 4, generating a recommended rehabilitation prescription corresponding to the grade C;
(4) when the evaluation result of the Medical Research Council is grade 5 or above, the recommended rehabilitation prescription generated is empty.

Preferably, the prescription recommendation service unit in the cloud server divides the obtained sputum excretion ability test evaluation results into two grades: auxiliary and autonomy, and generates the recommended rehabilitation prescriptions corresponding to the grade.

In the recommended rehabilitation prescription corresponding to the auxiliary grade, the training methods for sputum excretion ability is postural drainage techniques.

In the recommended rehabilitation prescriptions corresponding to the autonomy grade, the training methods for sputum excretion ability comprises coughing and huffing and active cycle of breathing techniques.

The classification method for the auxiliary grade and the autonomy grade is as follows:
  (1) when the peak expiratory flow PEF≥250 mL, generating a recommended rehabilitation prescription corresponding to the autonomy grade;
  (2) when the peak expiratory flow PEF<250 mL, generating a recommended rehabilitation prescription corresponding to the auxiliary grade.

Preferably, when the recommended rehabilitation prescription is sent to the prescription configuration module in the doctor mobile terminal for modification and confirmation by the doctor, it allows the doctor to set the volume of exercise for each exercise training program, the total volume of exercise $V_{period}$ of each individual exercise during each exercise cycle is expressed as:

$V_{period}$=number of repetition days within the cycle*number of repetitions per day*intensity of a single-session exercise;

among them, $V_{period}$ is set based on the function status detection data of patients, the number of repetitions within the cycle and the number of repetitions per day are set according to the specific type of exercise training program, and a single-session exercise intensity is calculated based on $V_{period}$, the number of repetitions within the cycle, and the number of repetitions per day.

The single-session exercise intensity is only measured by exercise physical load, and selecting measurement parameters that are not dependent on the patient's physiological indicators, the measurement method depends on the specific exercise program.

Preferably, the training task management unit in the cloud server generates a list of exercise training task plans for each exercise cycle based on $V_{period}$ and stores them. Specifically, the exercise interval time is determined based on the specific type of exercise training program, and a single-session exercise training time list is generated based on the number of repetitions within the cycle and the exercise interval time.

Preferably, the rehabilitation training module in the patient mobile terminal receives exercise training tasks from the training task management unit in the cloud server, and pushes the rehabilitation training content that needs to be carried out on that day to the patient in the form of a daily task list. The pushed content comprises the name of the exercise task, specific configuration parameter values of single-session exercise intensity, and instructions on exercise methods, guiding the patient to carry out rehabilitation training.

Preferably, during the process of guiding the patient to carry out rehabilitation training:

When patients undergo respiratory muscle training, limb muscle strength training, or sputum excretion ability training, the rehabilitation training module in the patient mobile terminal will pop up "Completed?", after the patient completes the training, the patient can choose "Completed" or "Not completed according to the standard".

If the patient selects "Completed", a voice prompt will pop up to encourage the patient to "Continue cheering" and an input box will pop up to remind the patient to input physiological parameters during the training process;

If the patient selects "Not completed according to standards", an input box will pop up to remind them to input the actual training content and physiological parameters during the training process.

Preferably, the prescription adjustment reminders comprise an intensity reduction reminder and an intensity increase reminder:

The situation for generating the intensity reduction reminder comprises:
  (1) for a single training program, if "Not completed according to the standard" occurs, generating the intensity reduction reminder corresponding to the training program;
  (2) for a single training program, if the Borg scale value is greater than or equal to 7, generating the intensity reduction reminder corresponding to the training program;
  (3) for limb muscle strength training, if there is a "heart rate value>(220-patient age)", generating the intensity reduction reminder corresponding to the limb muscle strength training program.

The situation for generating the intensity increase reminder comprises:
  (1) for a single training program, if "Completed" appears for a consecutive week, generating the intensity increase reminder corresponding to the training program;
  (2) for limb muscle strength training, if the message "Muscle strength grade during training>Muscle strength grade during limb muscle strength test evaluation" appears, generating the intensity increase reminder corresponding to the limb muscle strength training program;
  (3) for sputum excretion ability training, if "PEF value after training-PEF value during sputum achievement test evaluation>50" appears, generating the intensity increase reminder corresponding to the sputum excretion ability.

The rehabilitation training supervision unit in the cloud server regularly sends rehabilitation training reports and prescription adjustment reminders to the rehabilitation supervision module in the doctor mobile terminal, the doctor can adjust rehabilitation prescriptions based on the rehabilitation training reports and prescription adjustment reminders of patients, the rehabilitation training supervision unit in the cloud server regularly sends reassessment tasks to functional assessment module in the patient mobile terminal, and reminds patients to conduct periodic assessments to assess the effectiveness of rehabilitation and adjust rehabilitation prescriptions.

Comparing with the prior art, the beneficial effects of the present invention are as follows:
  (1) The system of the present invention grades the functional status detection results of patients, divides respiratory muscle test evaluation results into two subclass comprising strong and weak, divides the limb muscle strength test evaluation results into three subclass comprising A, B and C, divides the sputum excretion ability test evaluation results into two subclass comprising auxiliary and autonomy, and establishes the relationship between them and recommended rehabilitation prescriptions, that is, recommending rehabilitation prescriptions that include different training methods based on different evaluation grade, this not only further refines the training classification system, but also describes the differences in training methods among different patients for the same part of the body.

(2) For patients who require training in the same part but have different functional status detection results, the system of the present invention can recommend rehabilitation prescriptions corresponding to different subclass, and achieve individualized customization in a certain extent.

(3) Patients use readily available tools in their home environment to perform designated intensity exercise training based on the exercise training tasks pushed by the present invention, thereby achieving precise control of volume of exercise and placing the patient in a beneficial range of volume of exercise.

(4) In the system of the present invention, a single-session exercise intensity can often directly reflect the patient's functional condition, and visible numerical measurement of exercise intensity can be carried out. The patient can feel the changes in exercise intensity during long-term training, and then feel the changes in a certain aspect of their own function (such as limb muscle strength), which can enhance the patient's perception of the rehabilitation training effect and promote their long-term persistence.

DETAILED DESCRIPTION OF THE EMBODIMENTS

The present invention will be further explained in conjunction with the accompanying drawings and embodiments. It should be understood that these embodiments are only used to illustrate the present invention and not to limit its scope.

Figure 1:
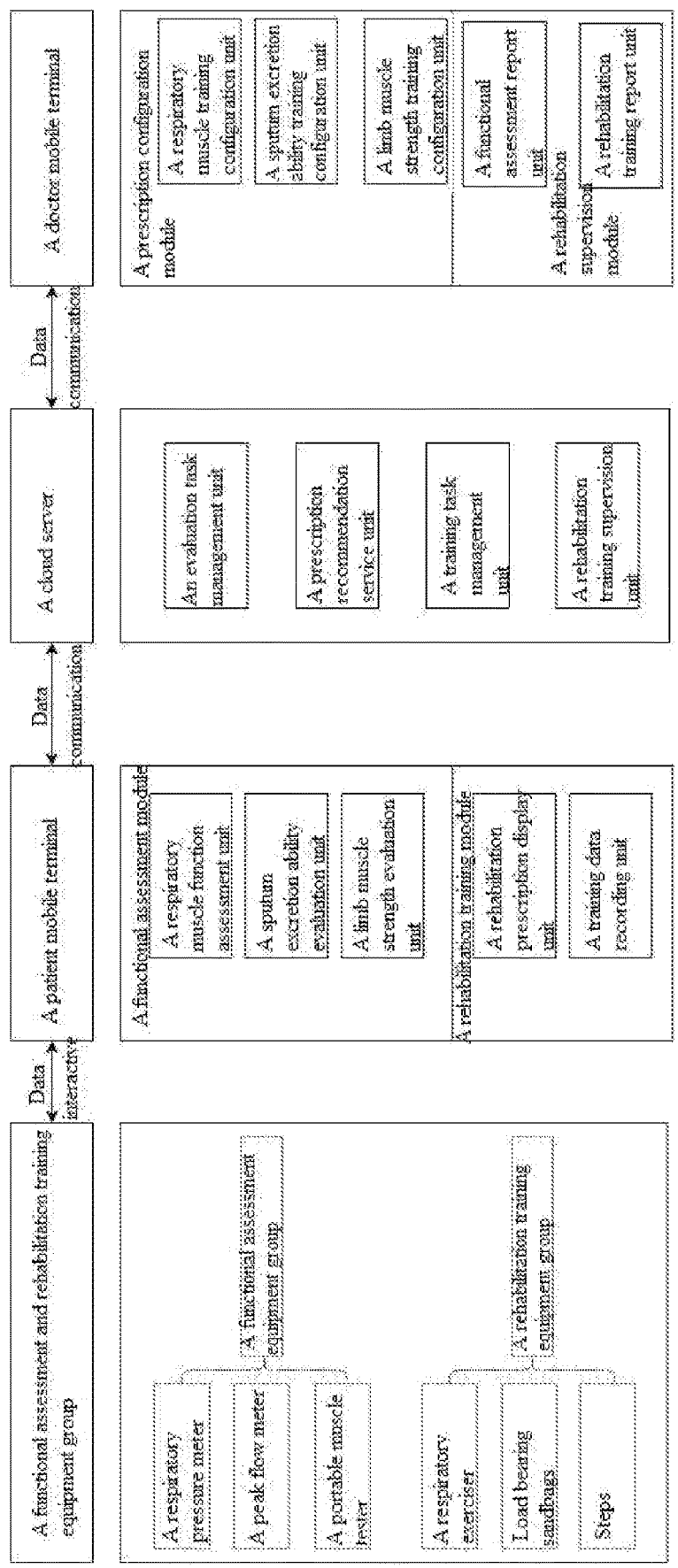
FIG. 1 shows the structure of the tele-health system of rehabilitation training guidance for patients with chronic respiratory failure.
Figure 2:
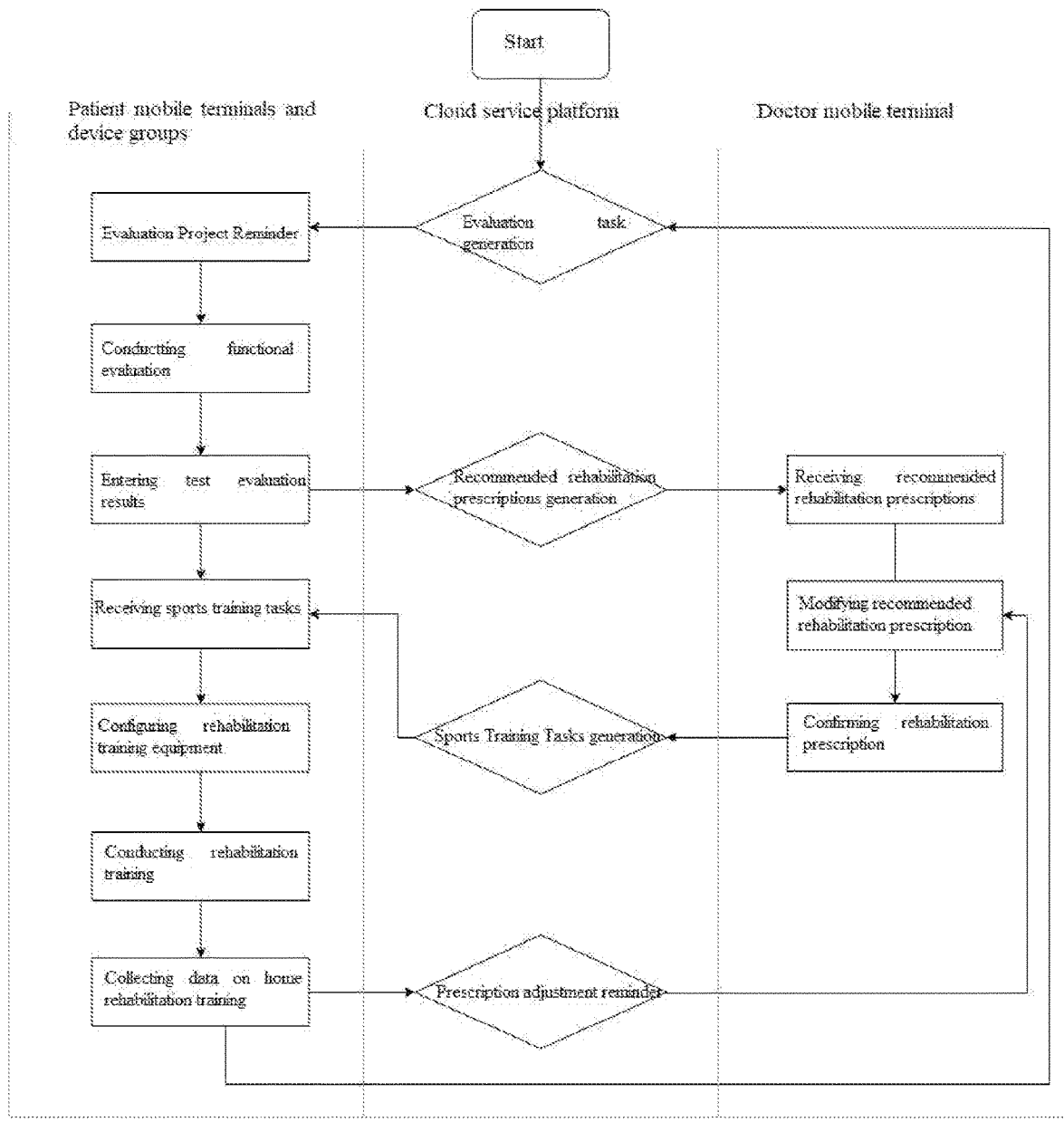
FIG. 2 is the workflow diagram of tele-health system of rehabilitation training guidance for patients with chronic respiratory failure.

The structure of the tele-health system of rehabilitation training guidance for patients with chronic respiratory failure is shown as FIG. 1, the workflow diagram is shown as FIG. 2.

A tele-health system of rehabilitation training guidance for patients with chronic respiratory failure, comprising a functional assessment and rehabilitation training equipment group, a patient mobile terminal, a cloud server, and a doctor mobile terminal; the functional assessment and rehabilitation training equipment group interacts with the patient mobile terminal, and the patient mobile terminal and the doctor mobile terminal communicate with the cloud server, respectively.

The functional assessment and rehabilitation training equipment group comprises a functional assessment equipment group and a rehabilitation training equipment group; the patient mobile terminal comprises a functional assessment module and a rehabilitation training module; the cloud server comprises an evaluation task management unit, a prescription recommendation service unit, a training task management unit, and a rehabilitation training supervision unit; the doctor mobile terminal comprises a prescription configuration module and a rehabilitation supervision module.

In the functional assessment and rehabilitation training equipment group, the functional assessment equipment group is used to detect the function status of patients, and the rehabilitation training equipment group is used for patients to perform home rehabilitation exercise.

In the patient mobile terminal, the functional assessment module is used to collect functional status detection data of patients and send them to the prescription recommendation service unit in the cloud server, while the rehabilitation training module is used to push rehabilitation prescriptions and collect home rehabilitation training data; the functional status detection data comprise maximal inspiratory pressure (MIP), maximal expiratory pressure (MEP), limb muscle strength grade, and peak expiratory flow (PEF).

In the cloud server described:

The evaluation task management unit is used to generate evaluation tasks and push them to the functional assessment module in the patient mobile terminal, reminding patients to conduct functional assessment.

The prescription recommendation service unit grades the acquired respiratory muscle test evaluation results, limb muscle strength test evaluation results and sputum excretion ability test evaluation results, generate the recommended rehabilitation prescription corresponding to the grade, and send the recommended rehabilitation prescription to the prescription configuration module in the doctor mobile terminal for modification and confirmation by the doctor; the recommended rehabilitation prescription comprises respiratory muscle training, limb muscle strength training, and sputum excretion ability training.

The training task management unit generates the rehabilitation prescription modified and confirmed from the doctor into exercise training tasks, and pushes the exercise training tasks to patients through the rehabilitation training module in the patient mobile terminal, and guides patients to undergo rehabilitation training, the patient's home rehabilitation training data are collected and transmitted to the rehabilitation training supervision unit in the cloud server by the rehabilitation training module in the patient mobile terminal.

The rehabilitation training supervision unit evaluates the home rehabilitation training situation of patients and generates rehabilitation training reports and prescription adjustment reminders. The rehabilitation training reports and prescription adjustment reminders are sent to the rehabilitation supervision module in the doctor mobile terminal.

In the functional assessment and rehabilitation training equipment group, the functional assessment equipment group comprises a respiratory pressure meter, a peak flow meter, and a portable muscle tester; the rehabilitation training equipment group comprises a breath muscle training device, load bearing sandbags, and steps; in the patient mobile terminal, the functional assessment module comprises a respiratory muscle function assessment unit, a sputum excretion ability evaluation unit, and a limb muscle strength evaluation unit; the rehabilitation training module comprises a rehabilitation prescription display unit and a training data recording unit; in the doctor mobile terminal, the prescription configuration module comprises a respiratory muscle training configuration unit, a sputum excretion ability training configuration unit, and a limb muscle strength training configuration unit; the rehabilitation supervision module comprises a functional assessment report unit and a rehabilitation training report unit.

The evaluation task management unit in the cloud server regularly generates evaluation tasks, with a time interval of preferably once every two weeks; after the function status of patients is detected, the prescription recommendation service unit in the cloud server divides the obtained respiratory muscle test evaluation results of the patient into two grades: strong and weak, and generates recommended rehabilitation prescriptions corresponding to the grades.

In the recommended rehabilitation prescription corresponding to the weak grade, the respiratory muscle training methods is suggestion breathing and external diaphragm pacing breathing.

In the recommended rehabilitation prescription corresponding to the strong grade, the respiratory muscle training methods comprises respiratory trainer training and barehanded resistance breathing training.

The classification method for the weak grade and strong grade is to calculate the patient's MIPpre and MEPpre, comparing with MIPmea and MEPmea, MIPpre is the predicted maximal inspiratory pressure, MEPpre is the predicted maximal expiratory pressure, MIPmea is the measured maximal inspiratory pressure, and MEPmea is the measured maximal expiratory pressure.

The calculation method for MIPpre is:

$$\text{Male: } MIPpre = 143 - 0.55 * Age$$
$$\text{Female: } MIPpre = 104 - 0.51 * Age$$

The calculation method for MEPpre is:

$$\text{Male: } MEPpre = 268 - 1.03 * Age$$
$$\text{Female: } MEPpre = 170 - 0.53 * Age$$

(1) when MIPmea<0.3*MIPpre, generating the recommended rehabilitation prescription corresponding to the weak grade;
(2) when MIPmea>0.3*MIPpre and MEPmea>0.3*MEPpre, generating the recommended rehabilitation prescription corresponding to the strong grade;
(3) when MIPmea>0.3*MIPpre and MEPmea<0.3*MEPpre, judging that the measurement value is incorrect, and the generated recommended rehabilitation prescription is empty.

The prescription recommendation service unit in the cloud server divides the obtained patient limb muscle strength test evaluation results into three grades: A, B and C, and generates recommended rehabilitation prescriptions corresponding to the grades.

In the recommended rehabilitation prescription corresponding to the grade A, the limb muscle strength training methods comprises neuromuscular electrical stimulation and assistance training.

In the recommended rehabilitation prescription corresponding to the grade B, the limb muscle strength training methods is active anti-gravity training, which comprises raise, wall leaning squat, sitting training, wall push-ups, sitting rowing, and sitting leg extension.

In the recommended rehabilitation prescription corresponding to the grade C, the limb muscle strength training methods is resistance training, which comprises shoulder press, dumbbell lateral raise, step stride, weight-bearing arm lift, and elastic band resistance.

The classification method for grade A, grade B, and grade C is as follows:
(1) when the evaluation result of the Medical Research Council (MRC) Scale for Muscle Strength is grade 0-1, generating a recommended rehabilitation prescription corresponding to the grade A;
(2) when the evaluation result of the Medical Research Council (MRC) Scale for Muscle Strength is grade 2-3, generating a recommended rehabilitation prescription corresponding to the grade B;
(3) when the evaluation result of the Medical Research Council (MRC) Scale for Muscle Strength is grade 4, generating a recommended rehabilitation prescription corresponding to the grade C;
(4) when the evaluation result of the Medical Research Council (MRC) Scale for Muscle Strength is grade 5 or above, the recommended rehabilitation prescription generated is empty.

The prescription recommendation service unit in the cloud server divides the obtained sputum excretion ability test evaluation results into two grades: auxiliary and autonomy, and generates the recommended rehabilitation prescriptions corresponding to the grade.

In the recommended rehabilitation prescription corresponding to the auxiliary grade, the training methods for sputum excretion ability is postural drainage techniques.

In the recommended rehabilitation prescriptions corresponding to the autonomy grade, the training methods for sputum excretion ability comprises cough training and active cycle of breathing techniques.

The classification method for the auxiliary grade and the autonomy grade is as follows:
(1) when the peak expiratory flow PEF≥250 mL, generating a recommended rehabilitation prescription corresponding to the autonomy grade;
(2) when the peak expiratory flow PEF<250 mL, generating a recommended rehabilitation prescription corresponding to the auxiliary grade.

Preferably, when the recommended rehabilitation prescription is sent to the prescription configuration module in the doctor mobile terminal for modification and confirmation by the doctor, it allows the doctor to set the volume of exercise for each exercise training program, the total volume of exercise $V_{period}$ of each individual exercise during each exercise cycle is expressed as:

$V_{period}$=number of repetition days within the cycle*number of repetitions per day intensity of a single-session exercise;

among them, $V_{period}$ is set based on the function status detection data of patients, the number of repetitions within the cycle and the number of repetitions per day are set according to the specific type of exercise training program, and a single-session exercise intensity is calculated based on $V_{period}$, the number of repetitions within the cycle, and the number of repetitions per day.

The single-session exercise intensity is only measured by exercise physical load, and selecting measurement parameters that are not dependent on the patient's physiological indicators, the measurement method depends on the specific exercise program, comprising:

The single-session exercise intensity of the suggestive breathing technique is measured by the number of breaths per minute.

The single-session exercise intensity of the diaphragmatic breathing is measured by the duration of a single-session exercise.

The single-session exercise intensity of threshold inspiratory muscle training is measured by inspiratory resistance, expiratory resistance, and number of breaths.

The single-session exercise intensity of manual resistance breathing training is measured by the weight of abdominal implants and the duration of breathing.

The single-session exercise intensity of step ups is measured by the height and number of steps;

The single-session exercise intensity of weighted shoulder press is measured by arm lifting position and weight bearing;

The single-session exercise intensity of side lateral raise is measured by weight bearing;

The single-session exercise intensity of hamstring stretch is measured by the angle of leg flexion.

The training task management unit in the cloud server generates a list of exercise training task plans for each exercise cycle based on $V_{period}$ and stores them. Specifically, the exercise interval time is determined based on the specific type of exercise training program, and a single-session exercise training time list is generated based on the number of repetitions within the cycle and the exercise interval time.

The rehabilitation training module in the patient mobile terminal receives exercise training tasks from the training task management unit in the cloud server, and pushes the rehabilitation training content that needs to be carried out on that day to the patient in the form of a daily task list. The pushed content comprises the name of the exercise task, specific configuration parameter values of single-session exercise intensity, and instructions on exercise methods, guiding the patient to carry out rehabilitation training.

Specifically, when the exercise training task comprises the threshold inspiratory muscle training, the push content also includes recommended values for expiratory pressure and inspiratory pressure, the patient set the expiratory pressure and inspiratory pressure of the threshold inspiratory muscle training based on the recommended values.

Specifically, when the exercise training tasks comprises shoulder press, side lateral raise, weighted shoulder press, and manual resistance breathing training, the push content also includes recommended weight bearing values, and the patient selects the weight of the load bearing sandbags used during the training based on the recommended values.

Specifically, when the exercise training task comprises step ups, the push content also includes the recommended step height value, and the patient selects the step height used during the training based on the recommended value.

During the process of guiding the patient to carry out rehabilitation training:

When patients undergo respiratory muscle training, the rehabilitation training module in the patient mobile terminal will pop up "Completed?", after the patient completes the training, the patient can choose "Completed" or "Not completed according to the standard".

If the patient selects "Completed", a voice prompt will pop up to encourage the patient to "Continue cheering" and an input box will pop up to remind the patient to input "minimum oxygen saturation" and "Borg scale value".

If the patient selects "Not completed according to standards", an input box will pop up to remind them to input the actual completed number of groups, duration, minimum oxygen saturation, oxygen uptake or not, maximum heart rate, Borg scale value, etc.

When patients undergo limb muscle strength training, the rehabilitation training module in the patient mobile terminal will pop up "Completed?", after the patient completes the training, the patient can choose "Completed" or "Not completed according to the standard".

If the patient selects "Completed", a voice prompt will pop up to encourage the patient to "Continue cheering" and an input box will pop up to remind the patient to input "Borg scale value", "heart rate" and "current muscle strength level".

If the patient selects "Not completed according to standards", an input box will pop up to remind them to input the actual completed number of groups, number of times per group, weight bearing value, maximum heart rate, and Borg scale value, etc.

When patients undergo sputum excretion ability training, the rehabilitation training module in the patient mobile terminal will pop up "Completed?", after the patient completes the training, the patient can choose "Completed" or "Not completed according to the standard".

If the patient selects "Completed", a voice prompt will pop up to encourage the patient to "Continue cheering" and an input box will pop up to remind the patient to input "PEF value" and "Borg scale value".

If the patient selects "Not completed according to standards", an input box will pop up to remind them to input the actual completed exhalation frequency, inhalation frequency, exhalation duration, inhalation duration, PEF value, and Borg scale value, etc.

Preferably, the prescription adjustment reminders comprise an intensity reduction reminder and an intensity increase reminder:

The situation for generating the intensity reduction reminder comprises:
  (1) for a single training program, if "Not completed according to the standard" occurs, generating the intensity reduction reminder corresponding to the training program;
  (2) for a single training program, if the Borg scale value is greater than or equal to 7, generating the intensity reduction reminder corresponding to the training program;
  (3) for limb muscle strength training, if there is a "heart rate value>(220-patient age)", generating the intensity reduction reminder corresponding to the limb muscle strength training program.

The situation for generating the intensity increase reminder comprises:
  (1) for a single training program, if "Completed" appears for a consecutive week, generating the intensity increase reminder corresponding to the training program;
  (2) for limb muscle strength training, if the message "Muscle strength grade during training>Muscle strength grade during limb muscle strength test evaluation" appears, generating the intensity increase reminder corresponding to the limb muscle strength training program;
  (3) for sputum excretion ability training, if "PEF value after training—PEF value during sputum achievement test evaluation>50" appears, generating the intensity increase reminder corresponding to the sputum excretion ability.

The rehabilitation training supervision unit in the cloud server regularly sends rehabilitation training reports and prescription adjustment reminders to the rehabilitation supervision module in the doctor mobile terminal, the doctor can adjust rehabilitation prescriptions based on the rehabilitation training reports and prescription adjustment reminders of patients, the rehabilitation training supervision unit in the cloud server regularly sends reassessment tasks to functional assessment module in the patient mobile terminal, and reminds patients to conduct periodic assessments to assess the effectiveness of rehabilitation and adjust rehabilitation prescriptions.

The above embodiments provide a detailed explanation of the technical solution of the present invention. It should be understood that the above are only specific embodiments of the present invention and are not intended to limit it. Any modifications, supplements, or similar substitutions made within the scope of the principles of the present invention should be included in the scope of protection of the present invention.

The invention claimed is:

1. A tele-health system of rehabilitation training guidance for patients with chronic respiratory failure, comprising a functional assessment and rehabilitation training equipment group, a patient mobile terminal, a cloud server, and a doctor mobile terminal; the functional assessment and rehabilitation training equipment group interacts with the patient mobile terminal, and the patient mobile terminal and the doctor mobile terminal communicate with the cloud server, respectively;

the functional assessment and rehabilitation training equipment group comprises a functional assessment equipment group and a rehabilitation training equipment group; the patient mobile terminal comprises a functional assessment module and a rehabilitation training module; the cloud server comprises an evaluation task management unit, a prescription recommendation service unit, a training task management unit, and a rehabilitation training supervision unit; the doctor mobile terminal comprises a prescription configuration module and a rehabilitation supervision module;

in the functional assessment and rehabilitation training equipment group, the functional assessment equipment group is used to detect functional status data of patients, and the rehabilitation training equipment group is used for patients to perform home rehabilitation exercise;

in the patient mobile terminal, the functional assessment module is used to collect the functional status data of patients and send them to the prescription recommendation service unit in the cloud server, while the rehabilitation training module is used to push rehabilitation prescriptions and collect home rehabilitation training data; the functional status data comprise maximal inspiratory pressure (MIP), maximal expiratory pressure (MEP), limb muscle strength grade, and peak expiratory flow (PEF);

in the cloud server described:

the evaluation task management unit is used to generate evaluation tasks and push them to the functional assessment module in the patient mobile terminal, reminding patients to conduct functional assessment;

the prescription recommendation service unit grades each of the acquired respiratory muscle test evaluation results, limb muscle strength test evaluation results and sputum excretion ability test evaluation results, generates the recommended rehabilitation prescription corresponding to separate grades of the acquired respiratory muscle test evaluation results, limb muscle strength test evaluation results and sputum excretion ability test evaluation results, and send the recommended rehabilitation prescription to the prescription configuration module in the doctor mobile terminal for modification and confirmation by the doctor; the recommended rehabilitation prescription comprises respiratory muscle training, limb muscle strength training, and sputum excretion ability training;

the training task management unit generates the rehabilitation prescription modified and confirmed from the doctor into exercise training tasks, and pushes the exercise training tasks to patients through the rehabilitation training module in the patient mobile terminal, and guides patients to undergo rehabilitation training, the patient's home rehabilitation training data are collected and transmitted to the rehabilitation training supervision unit in the cloud server by the rehabilitation training module in the patient mobile terminal;

the rehabilitation training supervision unit evaluates the home rehabilitation training situation of patients and generates rehabilitation training reports and prescription adjustment reminders, the rehabilitation training reports and prescription adjustment reminders are sent to the rehabilitation supervision module in the doctor mobile terminal.

2. The tele-health system of rehabilitation training guidance for patients with chronic respiratory failure according to claim 1, wherein, the evaluation task management unit in the cloud server regularly generates evaluation tasks, with a time interval of preferably once every two weeks.

3. The tele-health system of rehabilitation training guidance for patients with chronic respiratory failure according to claim 1, wherein, the prescription recommendation service unit in the cloud server divides the obtained respiratory muscle test evaluation results of the patient into two grades: strong and weak, and generates recommended rehabilitation prescriptions corresponding to the grades;

in the recommended rehabilitation prescription corresponding to the weak grade, the respiratory muscle training methods is suggestive breathing technique and diaphragmatic breathing;

in the recommended rehabilitation prescription corresponding to the strong grade, the respiratory muscle training methods comprises threshold inspiratory muscle training and manual resistance breathing training;

the classification method for the weak grade and strong grade is to calculate the patient's MIPpre and MEPpre, comparing with MIPmea and MEPmea, where MIPpre is the predicted maximal inspiratory pressure, MEPpre is the predicted maximal expiratory pressure, MIPmea is the measured maximal inspiratory pressure, and MEPmea is the measured maximal expiratory pressure; the calculation method for MIPpre is:

$$\text{Male: } MIPpre = 143 - 0.55 * \text{Age}$$

$$\text{Female: } MIPpre = 104 - 0.51 * \text{Age}$$

the calculation method for MEPpre is:

$$\text{Male: } MEPpre = 268 - 1.03 * \text{Age}$$

$$\text{Female: } MEPpre = 170 - 0.53 * \text{Age}$$

(1) when MIPmea<0.3*MIPpre, generating the recommended rehabilitation prescription corresponding to the weak grade;

(2) when MIPmea>0.3*MIPpre and MEPmea>0.3*MEPpre, generating the recommended rehabilitation prescription corresponding to the strong grade;
(3) when MIPmea>0.3*MIPpre and MEPmea<0.3*MEPpre, judging that the measurement value is incorrect, and the generated recommended rehabilitation prescription is empty.

4. The tele-health system of rehabilitation training guidance for patients with chronic respiratory failure according to claim 1, wherein, the prescription recommendation service unit in the cloud server divides the obtained patient evaluation results of limb muscle strength into three grades: A, B and C, and generates recommended rehabilitation prescriptions corresponding to the grades;
  in the recommended rehabilitation prescription corresponding to the grade A, the limb muscle strength training methods comprises neuromuscular electrical stimulation and assisted training;
  in the recommended rehabilitation prescription corresponding to the grade B, the limb muscle strength training methods is active anti-gravity training, which comprises heel raises, wall squat, sit to stand, wall push-ups, seated rowing, and hamstring stretch;
  in the recommended rehabilitation prescription corresponding to the grade C, the limb muscle strength training methods is resistance training, which comprises shoulder press, side lateral raise, step ups, weighted shoulder press, and stretch elastic band;
  the classification method for grade A, grade B, and grade C is as follows:
  (1) when the evaluation result of the Medical Research Council (MRC) Scale for Muscle Strength is grade 0-1, generating a recommended rehabilitation prescription corresponding to the grade A;
  (2) when the evaluation result of the Medical Research Council (MRC) Scale for Muscle Strength is grade 2-3, generating a recommended rehabilitation prescription corresponding to the grade B;
  (3) when the evaluation result of the Medical Research Council (MRC) Scale for Muscle Strength is grade 4, generating a recommended rehabilitation prescription corresponding to the grade C;
  (4) when the evaluation result of the Medical Research Council (MRC) Scale for Muscle Strength is grade 5 or above, the recommended rehabilitation prescription generated is empty.

5. The tele-health system of rehabilitation training guidance for patients with chronic respiratory failure according to claim 1, wherein, the prescription recommendation service unit in the cloud server divides the obtained sputum excretion ability test evaluation results into two grades: auxiliary and autonomy, and generates the recommended rehabilitation prescriptions corresponding to the grade;
  in the recommended rehabilitation prescription corresponding to the auxiliary grade, the training methods for sputum excretion ability is postural drainage techniques;
  in the recommended rehabilitation prescriptions corresponding to the autonomy grade, the training methods for sputum excretion ability comprises coughing and huffing and active cycle of breathing techniques,
  the classification method for the auxiliary grade and the autonomy grade is as follows:
  (1) when the peak expiratory flow PEF≥250 mL, generating a recommended rehabilitation prescription corresponding to the autonomy grade;
  (2) when the peak expiratory flow PEF<250 mL, generating a recommended rehabilitation prescription corresponding to the auxiliary grade.

6. The tele-health system of rehabilitation training guidance for patients with chronic respiratory failure according to claim 1, wherein, when the recommended rehabilitation prescription is sent to the prescription configuration module in the doctor mobile terminal for modification and confirmation by the doctor, it allows the doctor to set the volume of exercise for each exercise training program, the total volume of exercise $V_{period}$ of each individual exercise during each exercise cycle is expressed as:

$$V_{period} = \text{number of repetition days within the cycle} * \text{number of repetitions per day} * \text{intensity of a single-session exercise;}$$

among them, $V_{period}$ is set based on the function status detection data of patients, the number of repetitions within the cycle and the number of repetitions per day are set according to the specific type of exercise training program, and a single-session exercise intensity is calculated based on $V_{period}$, the number of repetitions within the cycle, and the number of repetitions per day.

7. The tele-health system of rehabilitation training guidance for patients with chronic respiratory failure according to claim 6, wherein, the single-session exercise intensity is only measured by exercise physical load, and selecting measurement parameters that are not dependent on the patient's physiological indicators, the measurement method depends on the specific exercise program.

8. The tele-health system of rehabilitation training guidance for patients with chronic respiratory failure according to claim 1, wherein, the rehabilitation training module in the patient mobile terminal receives exercise training tasks from the training task management unit in the cloud server, and pushes the rehabilitation training content that needs to be carried out on that day to the patient in the form of a daily task list, The pushed content comprises the name of the exercise task, specific configuration parameter values of single-session exercise intensity, and instructions on exercise methods, guiding the patient to carry out rehabilitation training.

9. The tele-health system of rehabilitation training guidance for patients with chronic respiratory failure according to claim 1, wherein, during the process of guiding the patient to carry out rehabilitation training:
  when patients undergo respiratory muscle training, limb muscle strength training, or sputum excretion ability training, the rehabilitation training module in the patient mobile terminal will pop up "Completed?", after the patient completes the training, the patient can choose "Completed" or "Not completed according to the standard";
  if the patient selects "Completed", a voice prompt will pop up to encourage the patient to "Continue cheering" and an input box will pop up to remind the patient to input physiological parameters during the training process;
  if the patient selects "Not completed according to standards", an input box will pop up to remind them to input the actual training content and physiological parameters during the training process.

10. The tele-health system of rehabilitation training guidance for patients with chronic respiratory failure according to claim 1, wherein, the prescription adjustment reminders comprise an intensity reduction reminder and an intensity increase reminder:

the situation for generating the intensity reduction reminder comprises:
(1) for a single training program, if "Not completed according to the standard" occurs, generating the intensity reduction reminder corresponding to the training program;
(2) for a single training program, if the Borg scale value is greater than or equal to 7, generating the intensity reduction reminder corresponding ti the training program;
(3) for limb muscle strength training, if there is a "heart rate value>(220−patient age)", generating the intensity reduction reminder corresponding to the limb muscle strength training program;
the situation for generating the intensity increase reminder comprises:
(1) for a single training program, if "Completed" appears for a consecutive week, generating the intensity increase reminder corresponding to the training program;
(2) for limb muscle strength training, if the message "Muscle strength grade during training>Muscle strength grade during limb muscle strength test evaluation" appears, generating the intensity increase reminder corresponding to the limb muscle strength training program;
(3) for sputum excretion ability training, if "PEF value after training−PEF value during sputum achievement test evaluation>50" appears, generating the intensity increase reminder corresponding to the sputum excretion ability.

* * * * *